United States Patent
Jacob et al.

(10) Patent No.: US 8,037,409 B2
(45) Date of Patent: Oct. 11, 2011

(54) METHOD FOR LEARNING PORTAL CONTENT MODEL ENHANCEMENTS

(75) Inventors: Richard Jacob, Ostfildern (DE); Timo Kussmaul, Boeblingen (DE); Stefan Liesche, Boeblingen (DE); Andreas Nauerz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 11/865,811

(22) Filed: Oct. 2, 2007

(65) Prior Publication Data
US 2008/0148145 A1 Jun. 19, 2008

(30) Foreign Application Priority Data
Dec. 19, 2006 (EP) .................................. 06126440

(51) Int. Cl.
*G06F 17/24* (2006.01)
(52) U.S. Cl. ...................................................... 715/243
(58) Field of Classification Search .................... 715/243
See application file for complete search history.

(56) References Cited

U.S. PATENT DOCUMENTS

| 7,062,511 | B1* | 6/2006 | Poulsen .................................. 1/1 |
| 2003/0117437 | A1* | 6/2003 | Cook et al. ..................... 345/764 |
| 2004/0070605 | A1* | 4/2004 | Huang et al. ................... 345/744 |
| 2005/0120288 | A1* | 6/2005 | Boehme et al. ............... 715/500 |
| 2006/0174187 | A1* | 8/2006 | White et al. ............... 715/501.1 |

* cited by examiner

*Primary Examiner* — Laurie Ries
*Assistant Examiner* — Tionna Smith
(74) *Attorney, Agent, or Firm* — Hoffman Warnick LLC; Daniel McLoughlin (57) ABSTRACT

A method and respective system for adapting the user-visible structure of a portal to the needs of a user, wherein the portal structure is stored in a content model, wherein a user interface component is provided for controlling the layout of the plurality of pages rendered at said portal, and wherein a model management component comprises the functionality for performing persistent content model modifications.

12 Claims, 9 Drawing Sheets

PRIOR ART
PORTAL SERVER

FIG. 1

PRIOR ART
PORTAL SERVER

FIG. 2

PRIOR ART INTERACTIONS

FIG. 3

FIG. 4 Partitioning Control flow

FIG. 5 Proposal generation Control flow

FIG. 6

FIG. 7 Visualize proposal

FIG. 9 application of prior art
agglomerative hierarchical clustering

METHOD FOR LEARNING PORTAL CONTENT MODEL ENHANCEMENTS

FIELD OF THE INVENTION

The present invention relates to the field of network computing and in particular to web portals. In particular the present invention relates to a method and respective system for adapting the user-visible structure of a portal to the needs of a user, wherein the portal structure is stored in a content model, wherein a user interface component is provided for controlling the layout of the plurality of pages rendered at said portal, and wherein a model management component comprises the functionality for performing persistent content model modifications.

BACKGROUND OF THE INVENTION

Figure 1:
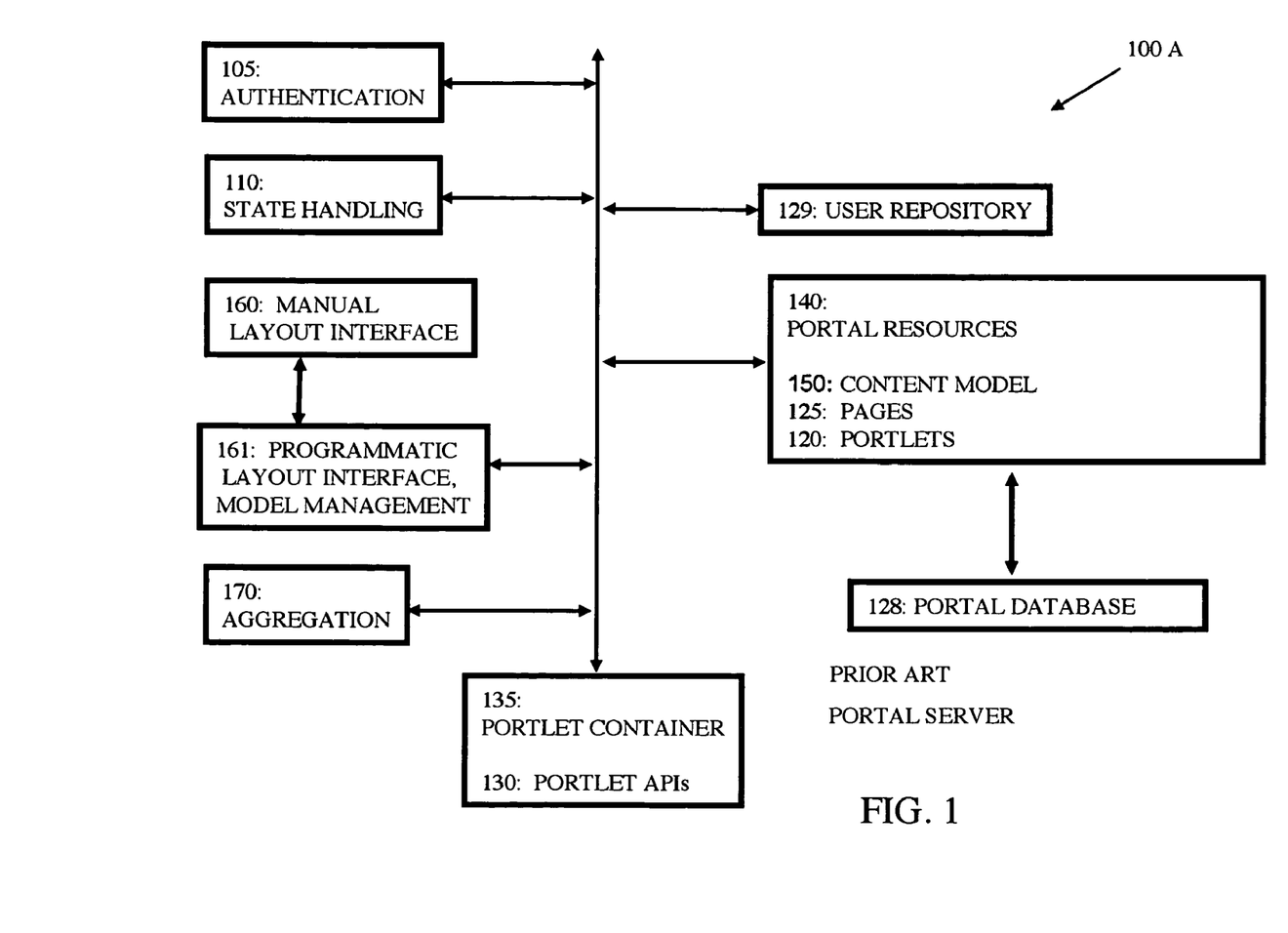
FIG. 1 illustrates the most basic structural components of a prior art portal server environment used in prior art.

FIG. 1 gives a schematic system view of a portal server implementing such prior art web portal.

A prior art portal as, for example, represented by IBM WebSphere Portal, is built by a complex functionality implemented on a network server—for example a web server 100, the most important elements of which are logic components for user authentication 105, state handling 110, aggregation 170 of fragments, a plurality of portlets 120—further described herein—provided in respective pages 125 with a respective plurality of APIs 130 to a respective portlet container software 135 for setting them into the common web page context, and some portal storage resources 140. The logic components are operatively connected such that data can be exchanged between single components as required. This is roughly depicted in FIG. 1.

The portal realizes a request/response communication pattern, i.e., it waits for client requests and responds to these requests. A client request message includes a URL/URI which addresses the requested portal page.

In more detail, a portal engine of the web server in FIG. 1 implements an aggregation of portlets 120 based on the underlying portal content model 150 comprising a hierarchy of portal pages that may include portlets and portal information such as security settings, user roles, customization settings, and device capabilities. Within the rendered page, the portal automatically generates the appropriate set of navigation elements based on the portal model. The portal engine invokes portlets during the aggregation as required and when required and uses caching to reduce the number of requests made to portlets. The prior art IBM WebSphere Portal employs open standards such as the Java portlet API (Application Programming Interface). It also supports the use of a remote portlet via the WSRP standard.

The portlet container 135 is a single control component competent for all portlets 120, which may control the execution of code residing in each of these portlets. It provides the runtime environment for the portlets and facilities for event handling, inter-portlet messaging, and access to portlet instance and configuration data, among others.

The portal resources 140 are, in particular, the portlets 120 themselves and the pages 125, on which they are aggregated in form of an aggregation of fragments and the navigation model. A portal database 128 stores the portlet description, wherein the detail of the portlet description includes some attributes like portlet name, portlet description, portlet title, portlet short title, and keywords. The portal database also stores the content model 150, which defines the portal content structure, i.e., the structure of pages and comprises page definitions. A page definition describes a portal page and references the components (e.g., portlets) that are contained in this page. This data is stored in the database 128 in an adequate representation based on prior art techniques like relational tables.

Some prior art portals contain a navigation component which provides the possibility to nest elements and to create a navigation hierarchy, which is stored in the portal model. An activity in the rendering and aggregation processes is the generation of URLs that address portal resources, e.g., pages. A URL is generated by the aggregation logic and includes coded state information.

The aggregation state as well as the portlet state is managed by the portal. Aggregation state can include information like the current selection including the path to the selected page in the portal model, the portlets modes and states, the portlet render and action parameters, etc.

By including the aggregation state in a URL, the portal ensures that it is later able to establish the navigation and presentation context when the client sends a request for this URL.

A portlet can request the creation of a URL through the portlet API and provide parameters, i.e., said portlet render and action parameters to be included in the URL.

The portlet container 135 is a single control component competent for all portlets 120, which may control the execution of code residing in each of these portlets. It provides the runtime environment for the portlets and facilities for event handling, inter-portlet messaging, and access to portlet instance and configuration data, among others. The portal resources 140 are in particular the portlets themselves and the pages on which they are aggregated in form of an aggregation of fragments.

The user repository 129 contains user information and authentication information for each portal user. The user repository may be implemented in a database or a prior art LDAP directory. The user repository supports various retrieval operations to query information about one user, multiple users or all portal users.

Next, and with special focus to the present invention, prior art content model modifications are described which includes a graphical user interface component 160 that provides for manually controlling the layout of the plurality of rendered pages. By that interface 160 a portal administrator or a user is enabled to control the visual appearance of the web pages, for example by creating new pages, or by adding or removing portlets on pages. In particular, the administrator or user can decide which portlet is rendered at which location next to which other portlet at a given web page. The manual layout interface 160 invokes a model management component 161 which comprises the functionality for performing persistent content model modifications and offers an API for invoking this functionality.

Some prior art portals support the concept of so-called "page derivation". This prior art concept allows for a stepwise specialization of a page. In the first step, administrator A creates a page P, defines a base layout, and adds content, i.e., portlets, to the page. After that, the administrator grants appropriate rights to other administrators or users, who themselves can modify the page and edit the layout and content of a page, thus creating a page P' that is derived from page P and is specialized to the needs of one or multiple users. Page derivation is a prior art concept which allows to derive multiple pages from an original page, each page being adapted specifically for a user or a group of users. The portal manages the derivation hierarchy and ensures that the user obtains the correct derived page out of the hierarchy of derived pages.

When an administrator or a user modifies the page, model management 161 creates a derivation of the page and stores it into the portal database. It also stores an association between the implicit derivation and the user that performed the page modification.

For example, administrator A creates a page X that comprises portlet A, administrator B adds portlet B to page X, which results in the creation of the derived page X', and user C is authorized to view the page X (and thus X'). In this case, when issuing a request for page X, administrator A will see portlet A (corresponding to page X), administrator B will see portlet A and B (corresponding to page X') and user C will also see portlets A and B (corresponding to page X'). Aggregation 170 automatically selects the according page during request processing based on aggregation state and the ID of the user issuing the request.

Now user C is assumed to modify the page to include portlet C. The portal thus creates a new derived page X" and stores this into the database 128. The derived page is associated with user X.

When invoking a request for page X now, administrator A will see portlet A, administrator B will see portlet A and B (corresponding to page X') and user C will see portlets A, B and C (corresponding to page X").

Figure 2:
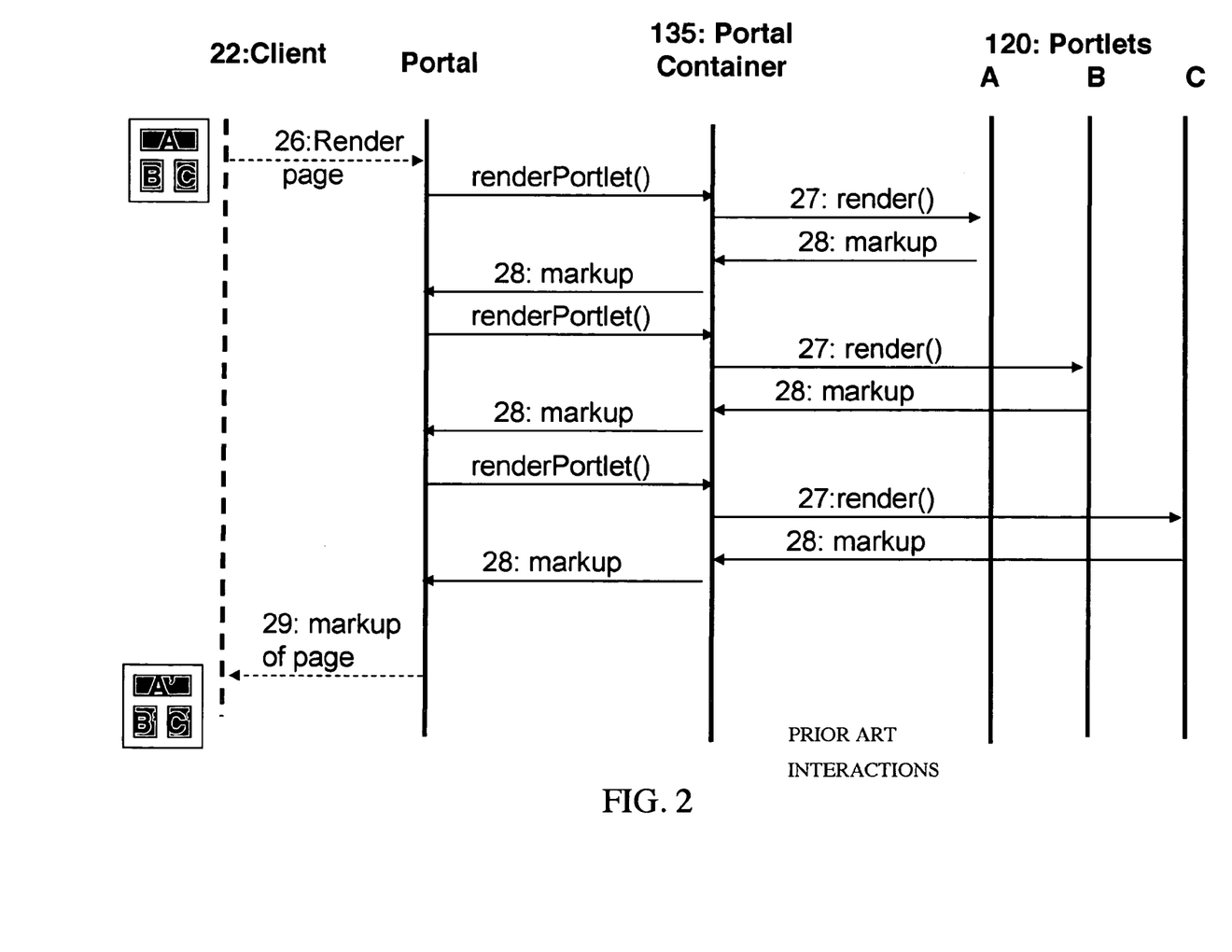
FIG. 2 illustrates the prior art interactions between a client browser and the portal server, as well as between portal server and portal container and portlets in a situation in which the client issues a render request for a given webpage of the portal.

FIG. 2 depicts prior art interactions in a portal during the render request processing. A client 22 is depicted left, depicting the display of the portlet markup A, B, and C of respective portlets in the client browser. The portal container 135 in the central portion and the diverse portlets 120 (A, B, C) are depicted right. The communication is based on requests which are expressed in the depicted arrows.

In particular, the client issues a render request 26, e.g., for a new page, by clicking on a link displayed in its browser window. The link contains a URL and in reaction to the user action the client issues a render request 26 containing the URL. To render this new page, the portal—after receiving the render request 26—invokes state handling passing said URL; state handling then determines the aggregation state and the portlet state that is encoded in the URL or is associated with the URL. Typically, the aggregation state contains an identification of the requested page. Aggregation checks if a derived page exists for this user. Aggregation loads the according page definition from the portal database and determines the portlets that are referenced in this page definition, i.e., that are contained on the page. It sends an own render request 27 to each portlet through the portlet container 135.

In prior art, each portlet A, B and C creates its own markup independently and returns the markup fragment with the respective request response 28. The portal aggregates the markup fragments and returns the new page 22' to the client in a respective response 29.

In prior art modifications to the content model must be performed manually, either by the user himself or by the administrator of the portal.

Although the content structure given in FIG. 2 is held deliberately simple, a person skilled in the art will appreciate that the task of configuring the pages of a portal is no more trivial, when the number of portlets and the number of pages increases.

A typical larger enterprise's portal, however, contains large numbers, e.g., thousands of pages and portlets. Due to the complexity of an enterprise portal, manual administration is inefficient as it is time-consuming, error-prone and thus expensive. In addition, in a complex portal it is not possible for a human administrator to capture the personal requirements and personal desires of all users; thus an administrator will very often not be able to arrange all pages and portlets properly, such that a user visiting the portal may easily find his way.

An improper configuration of portal pages results in a user-unfriendly content structure and in difficult navigation. This may disadvantageously degrade the usability of the portal and a user's productivity, as the user is not able to access required content or required portlets or has to perform too many switches between pages in order to work with the portal.

Accordingly, there is an opportunity for additional help-desk support and user training in such a complex content structure.

SUMMARY OF THE INVENTION

It is object of the present invention to improve the management of the content model of a web portal.

As aspect of the present invention is achieved by the features stated in enclosed independent claims. Further advantageous arrangements and embodiments of the invention are set forth in the respective dependent claims. Reference should now be made to the appended claims.

According to a first aspect of the present invention a portal server is disclosed to implement a method for adapting the content structure of a portal, wherein said portal content structure is stored in a content model, wherein a user interface component is provided for controlling the layout of the plurality of pages rendered at said portal, and wherein a model management component comprises the functionality for performing persistent content model modifications, the method comprising: storing for a plurality of users participating in said method modification data records comprising history information indicating historic portal content model modifications performed by said plurality of users, wherein a data record further comprises the user identification of the modifying user, the page identification, the identification of the underlying modification operation and the identification of the portlet involved in said modification; performing a grouping on said plurality of users applying the criterion of similar or identically performed portal content model modifications, resulting in a number of groups, wherein a group comprises one or more user IDs associated with respective ones of the plurality of participating users; generating a set of personalized content model modification proposals from one of the modification data records, by selecting the group which comprises the user ID that is comprised of the modification data record and doing for each of the users comprised of the selected group: generating a personalized proposal data set based on data of the modification record and the personal user ID of a respective user of the selected group; (storing the set in a proposal database) when receiving a request issued by a client on behalf of a user where the request is directed to the portal (this can be for example a login request, a page render request, or an action request for requesting the proposals explicitly) retrieving at least one of the proposals associated with the requesting user; generating markup reflecting the at least one proposal; and, sending the markup to the client browser associated with the requesting user.

By that, an advantage results that a user participating in the above method may regularly obtain by those proposal the web page layout modifications generated by other users having the same or quite identical needs when visiting the web portal in a personalized form. In this manner, clever ideas of users which contribute to an improved man machine interface for a given web portal are automatically proposed to a certain subset of users which can be reasonably be assumed to accept the proposed layout, because the probability is high that the proposed layout of a web page will satisfy their personal needs. By that, the above mentioned objective is achieved.

When further the before mentioned layout proposal is displayed to the user including an option to either accept it or to refuse it, and an action request associated with the current user is processed either to accept the proposed layout or to refuse it, then the flexibility of the method of the present invention is increased because the current user may easily decide in the above sense and may easily effectuate his decision.

Further, the above mentioned retrieving, generating and/or sending steps may be performed in response to the occurrence of some predefined events. So, if one of the following events occurs, the steps can be performed: A login of the current user at the portal in question, the actuation of a user control which is dedicated explicitly for the case and comprised of the portal markup, or entry of a client issued request for a web page for which layout proposals are available.

In order to efficiently manage the portal modification transactions done by the user, it is proposed to provide a separate modification history database in order to store the modifications persistently.

When a layout proposal of a certain webpage is exposed to a user, then, advantageously one of the following or a combination of the following items can be exposed: the name of a portlet associated with the layout proposal; the description of the portlet associated with the layout proposal; keywords of a the portlet associated with the layout proposal; or, a graphical representation of a portlet associated with the layout proposal and its proposed location at the currently displayed web page; or, a markup fragment that is generated by a portlet associated with the layout proposal.

Further, the aforementioned step relating to the step of storing history information may include to store only differences relative to a preexisting reference content model of the portal. This saves storage space and provides for an efficient application programming interface between the database and the functional module which performs the grouping algorithm, as this algorithm also acts only on modifications of the content model.

Proposal generation and proposal visualization may be done asynchronously.

BRIEF DESCRIPTION OF THE DRAWINGS

The present invention is illustrated by way of example and is not limited by the shape of the figures of the drawings in which.

DETAILED DESCRIPTION

Figure 3:
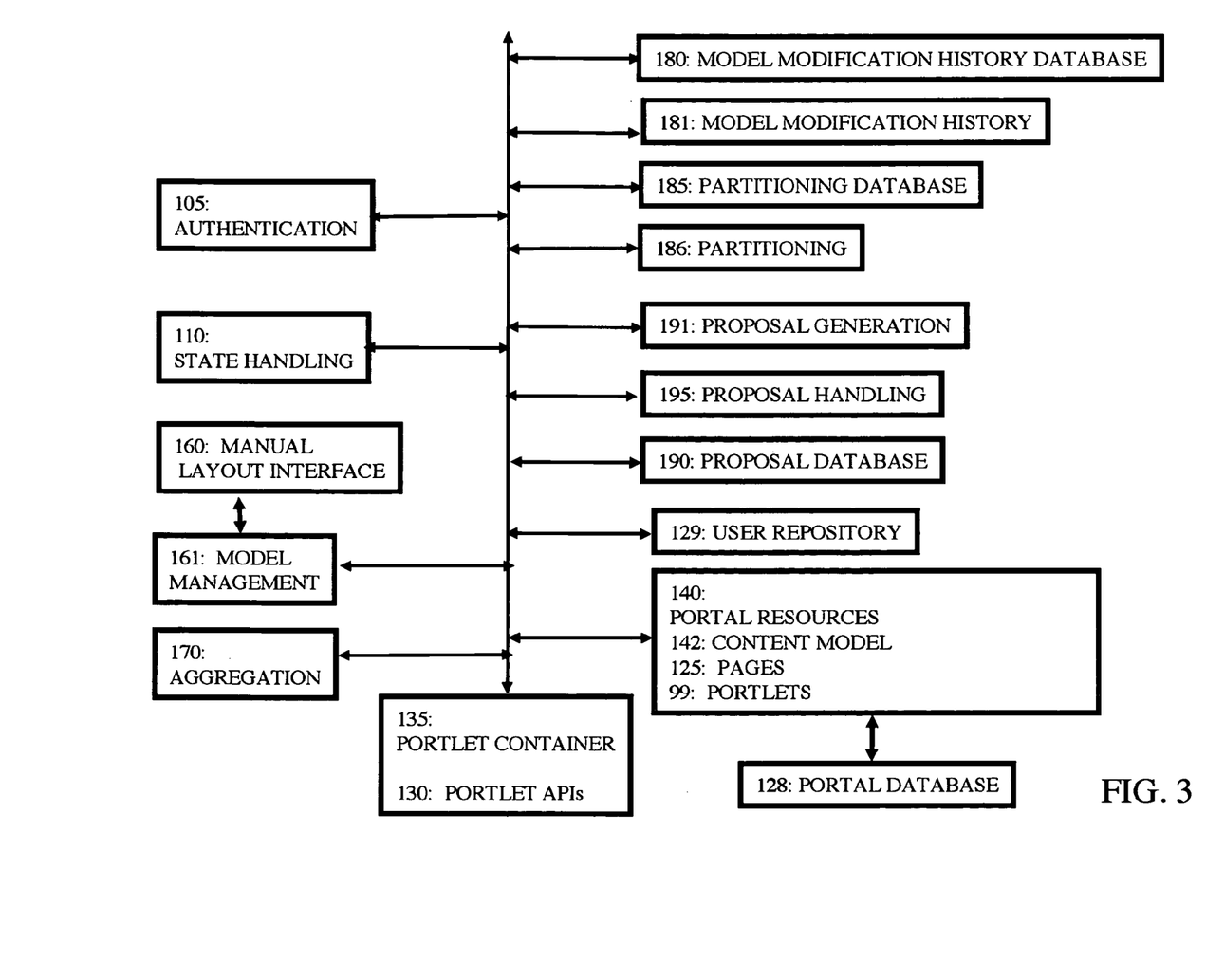
FIG. 3 is a representation according to FIG. 1, enriched by the components involved in an embodiment of the present method.

With general reference to the figures and with special reference now to FIG. 3, in an embodiment the model management component 161 is extended to invoke a software component 181 provided according to an embodiment, denoted "model modification history", when a modification of the portal model is processed. Model modification history 181 offers an interface for invocation, wherein the invocation request contains an ID of the modified page and a modification description. It contains for example the operation, either "add" or "remove" indicating that a portlet is added or is removed, and the ID of the portlet, e.g., portlet X.

Model modification history 181 stores this data as well as a timestamp and the user ID in a model modification history database 180, preferably in a tabular representation, of which an exemplary record is given as follows:

| User ID, | Page ID, | operation, | portlet ID, | timestamp |
|---|---|---|---|---|
| U, | Y, | add, | X, | 2006-27-11 18:01:12 |

This model modification record represents the following modification: user U has added portlet X to page Y.

Thus, the model modification history database contains a set of records each describing a modification operation performed by a portal user.

A software component provided according to an embodiment denoted as "partitioning" 186 creates a partitioning of portal users, where users that have performed similar model modifications are grouped together in one partition.

In an embodiment the portal invokes partitioning 186 at pre-defined points in time, e.g., every night at 1:00 a.m. or once a week, preferably during weekends or other periods of low workload.

In another embodiment of the method a user may himself trigger the invocation of the partitioning function.

Figure 4:
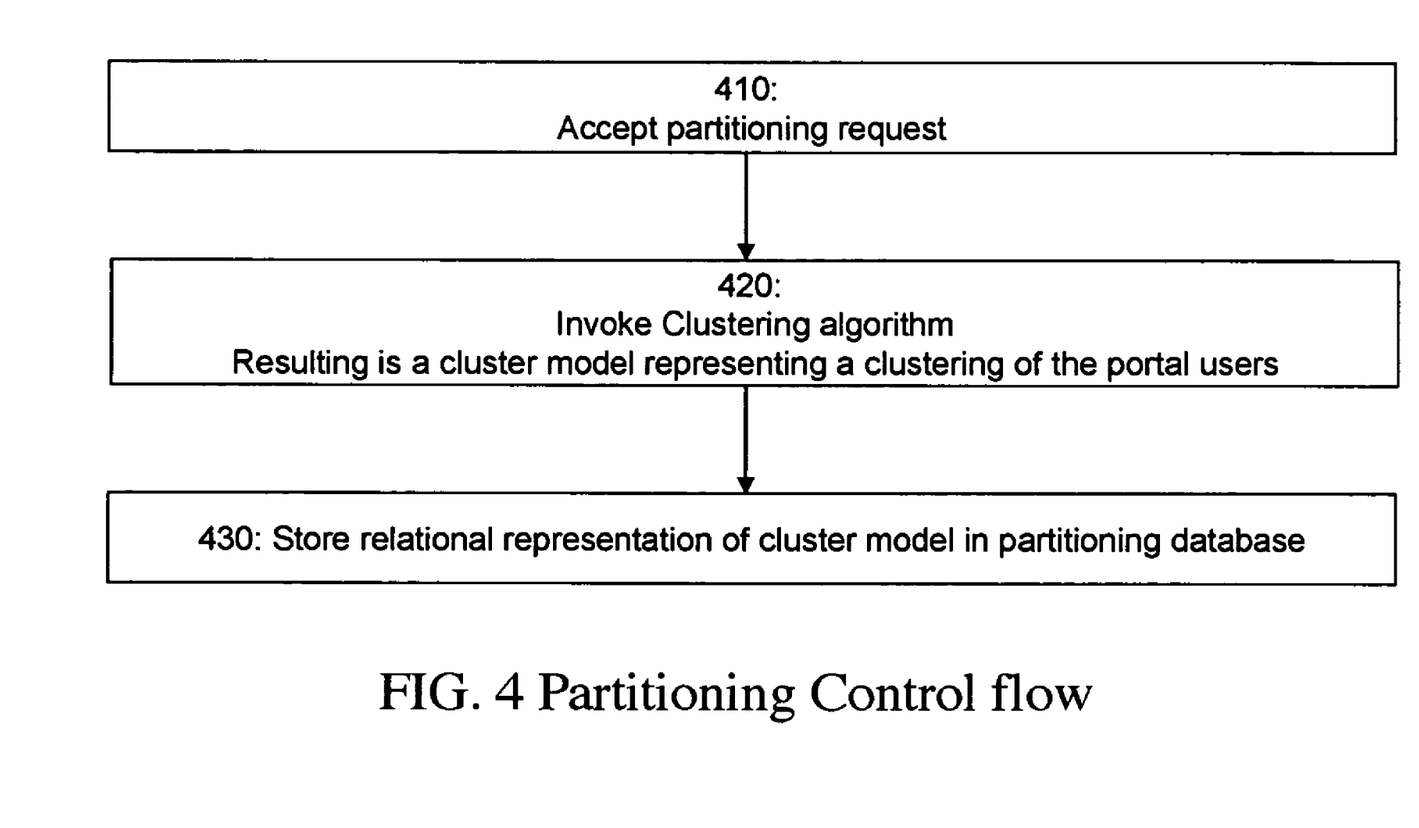
FIG. 4 is a schematic illustration of the control flow performed for clustering or partitioning the portal visitors.

With additional reference to FIG. 4 illustrating the rough control flow of the component partitioning 186, this component 186 accepts the invocation request, i.e., partitioning request in a step 410, and invokes a prior art clustering algorithm in a block of steps 420.

The input data for the prior art clustering method are provided according to the present invention as follows: 1) Content model modifications effected by portal users; here the datasets stored in the model modification history database 180 should be used. 2) User IDs of all portal users.

The clustering algorithm will return a cluster model that represents a clustering or the above mentioned "partitioning" of the portal users according to their personal model modification history.

Partitioning 186 creates and stores a relational representation of the clustering model in a dedicated partitioning database 185. The relational representation associates each user with a cluster, e.g. user U is assigned to cluster 2, user V is assigned to cluster 3, etc.:

| User-ID, | cluster-ID |
|---|---|
| U, | 2 |
| V, | 3 |

For above mentioned block 420, basic prior art data mining technology can be applied. This data mining function includes a prior art clustering algorithm which is applied to the present data, and that returns a set of clusters of related users.

Briefly, the clustering returns a set of clusters, i.e., the set of all clusters is a function of all users. As a person skilled in the art knows, clustering is the process of grouping a set of objects into classes of similar objects. Central to clustering is the objective to determine the degree of similarity (or dissimilarity) between individual objects and between clusters, which is expressed as a distance value.

Figure 9:
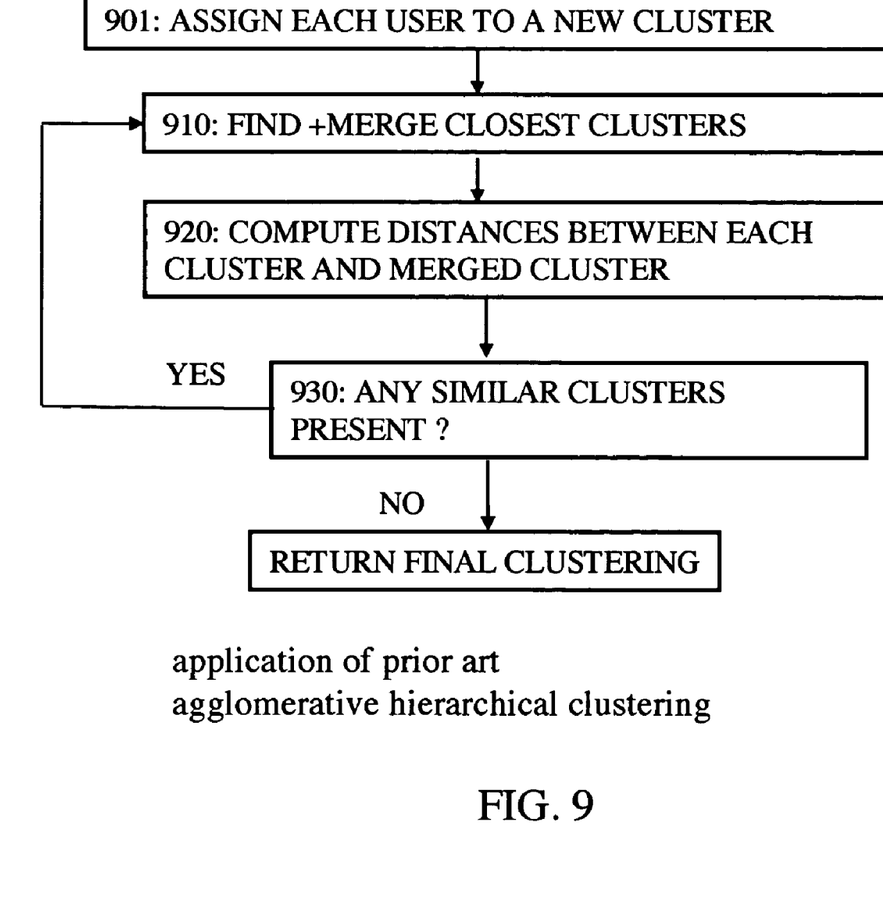
FIG. 9 illustrates the basic control flow of prior art agglomerative, hierarchical clustering, applied also in an embodiment of the method according to the present invention.

An algorithm of the invention uses prior art agglomerative hierarchical clustering techniques which iteratively join together similar clusters. This is depicted in FIG. 9. The application thereof in the context of the present invention will be described in more detail next below:

Step 901: The algorithm starts by assigning each user to a cluster, so that if there is a number of N (N can be any realistic number, 200, 500, 1000, etc., for example) users, initially there are N clusters, each containing just one user. For each pair of clusters, the distance (described later below in more detail) between the cluster pair is the same as the distance between the users they contain.

Step 910: in this step, the closest (most similar) pair of clusters is determined. Then, they are merged into a single cluster, so that now it remains a reduced number (N−1) of clusters.

Step 920: Then the distances between the new cluster and each of the old clusters is computed.

Then a loop condition 930 "Do the distance values exceed a pre-defined distance threshold?" is executed and steps 910 and 920 are repeated, until the distance values exceed this pre-defined distance threshold TH, i.e., the loop is continued and the cluster get merged in order to contain more and more users as group members, until there are no more similar clusters—according to the user-defined distance Th—which could be merged in a further iteration of step 910. The value Th is configurable, for example it is chosen by an administrator, thereby allowing to specify since what degree of dissimilarity between any two clusters no merging between these two clusters should be done anymore.

Note that for didactical reasons, the check to terminate the loop is done at the end of the loop (after at least one iteration); preferably, in real applications, this test should be done in the beginning of the loop, allowing zero iterations as well, thus allowing the case, where no merging happens at all.

The end result of the mining function is thus in general a reduced number of clusters, wherein each cluster comprises a certain plurality of users.

Other embodiments also provided by the present invention may use respective different cluster algorithms, e.g., partitional clustering like k-means clustering, etc. In the following, the distance calculation which is basically applicable in any of above mentioned cluster algorithms, and which is also applied in the method of the present invention is described in more detail as follows:

The distance value d (A,B) between two users A and B is computed as follows: Retrieve two sets of model modification records from the model modification database created in the last T days, the one set being associated with user A, the other set being associated with B. Here, the parameter T is a configurable parameter, which allows to ignore model modifications that are too old to be relevant. Compare both sets of model modification records; Let x1 be the number of common model modifications (i.e., modification operations that both users performed); Let x2 be the number of different model modifications (i.e., that only one user has performed); Let distance value d=f(x1, x2), i.e., compute a resulting distance value by use of a pre-defined function, which is for example in its most simple form f(x1, x2)=x2/(1+x1).

Of course other formulas or other variables can be used, e.g., Let z1 be the number of pages that were modified by at least one of the two users and have a common layout for both users; Let z2 be the number of pages that were modified by at least one of the two users and have a different layout for both users; Let distance value d=f(z1, z2), e.g. f(z1, z2)=z2/(1+z1).

On basis of user distance, an inter-cluster distance is defined. The distance D(X, Y) between two clusters X, Y is computed by aggregating the distance values of pairs of users in X and Y, for example in a complete linkage method, wherein the aggregation is performed by calculating the maximum of all distances between pairs of users in two clusters: D(X, Y)=max {d(A, B) where user A is in cluster X and user B is in cluster Y} If a cluster contains more than one portlet, then a respective number of calculations are done.

Alternatively, an average distance can be calculated. Then, the aggregation is performed by calculating the average of all distances between pairs of users in two clusters):

$$D(X, Y) = \text{avg } \{d(A, B), \text{ where user } A \text{ is in cluster } X \text{ and user } B \text{ is in cluster } Y.$$

Figure 5:
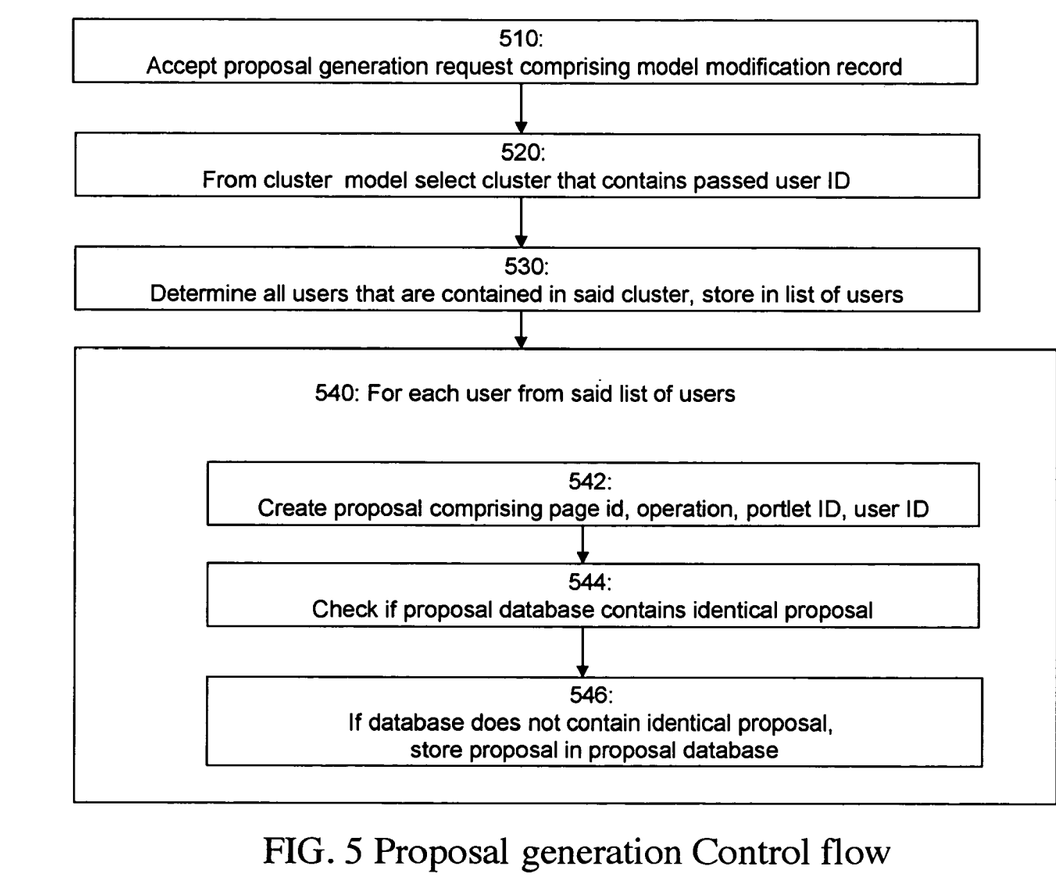
FIG. 5 is an illustration of the control flow of an embodiment of the present method, followed in order to generate layout proposals for a certain portal page.

With reference now to FIG. 5 the control flow of the method generating a proposal for a newly laid out web page is described in more detail.

In an embodiment of the present invention component model modification history 181 (FIG. 3) invokes a component "proposal generation" 191 provided by the present invention, when it is invoked itself, i.e., when a user performs a content model modification. In this embodiment model modification history 181 invokes proposal generation 191 for exactly one content model modification; proposal generation 191 will then create adequate proposals for a specific user group defined by a specific cluster of the clusters generated before and described with reference to FIG. 4.

Proposal generation 191 passes the content model modification record, which contains user ID, page ID, operation, portlet ID and timestamp. Based on the partitioning result, thus, in particular for all users comprised of the user partition the user belongs to, who effected the modification, the component proposal generation 191 generates a set of user-specific model modification proposals—one proposal for each user.

In a first step 510 proposal generation 191 accepts a proposal generation request. In a step 520, it then selects the ID of the cluster that contains the user ID comprised of the model modification record. Then in a next step 530, proposal generation 191 selects all users that are contained in this cluster into a list of users (besides the passed user). It iterates in block 540 over this list of users, for each user performing the following steps:

Step 542: Create a proposal comprising the page ID, the operation, the portlet ID and the user ID, Step 544: Check if the proposal database already contains an identical proposal;

Step 546: If the proposal database does not contain an identical proposal, generate a proposal ID, add this proposal ID to the tabular representation and then store the proposal in a tabular representation in the proposal database 190.

Figure 6:
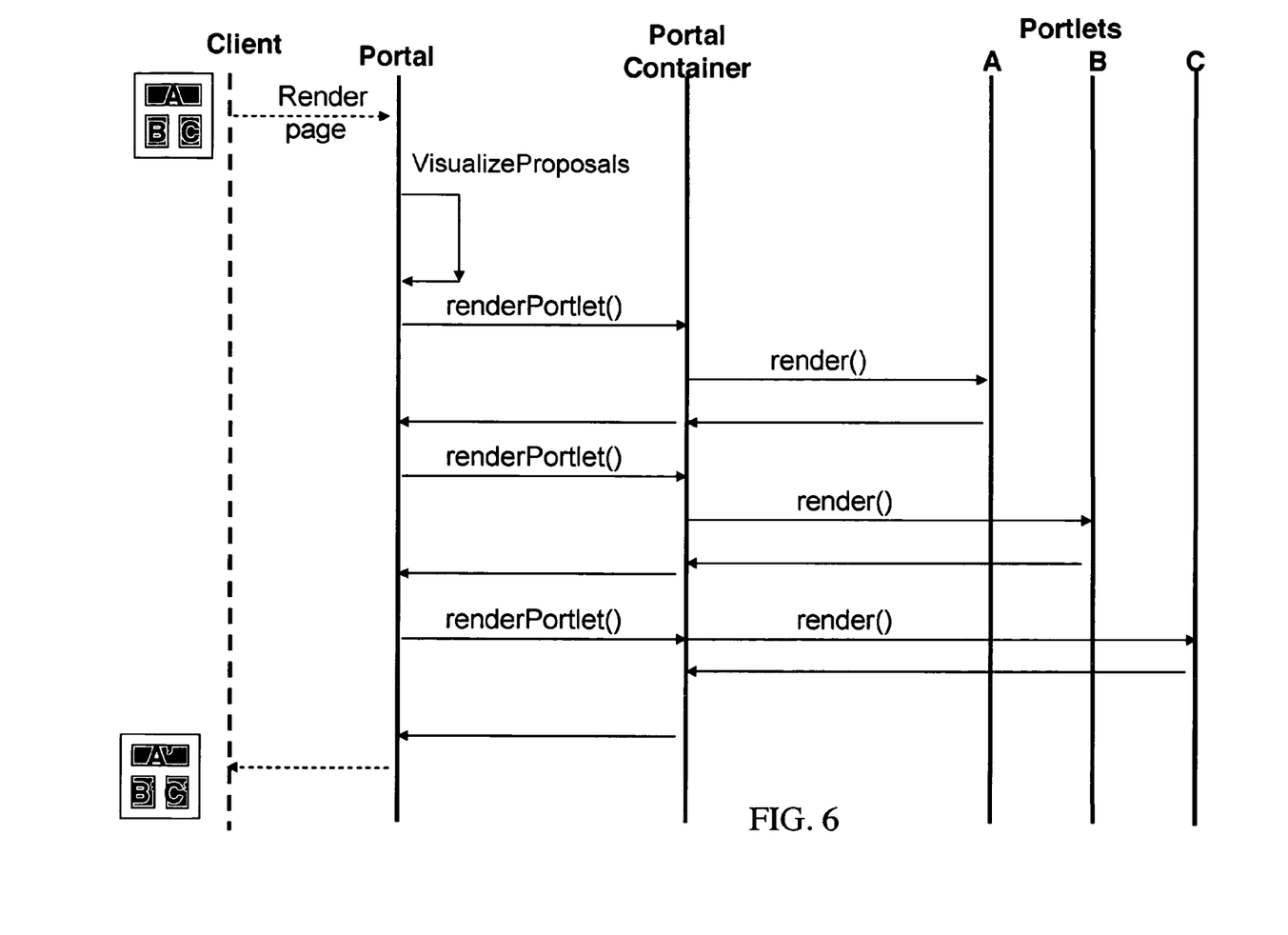
FIG. 6 is an illustration according to FIG. 2, modified to include the features of an embodiment of the method according to the present invention.

Next, it is referred to FIG. 6 which illustrates the interactions for processing a render request according to an embodiment.

Figure 7:
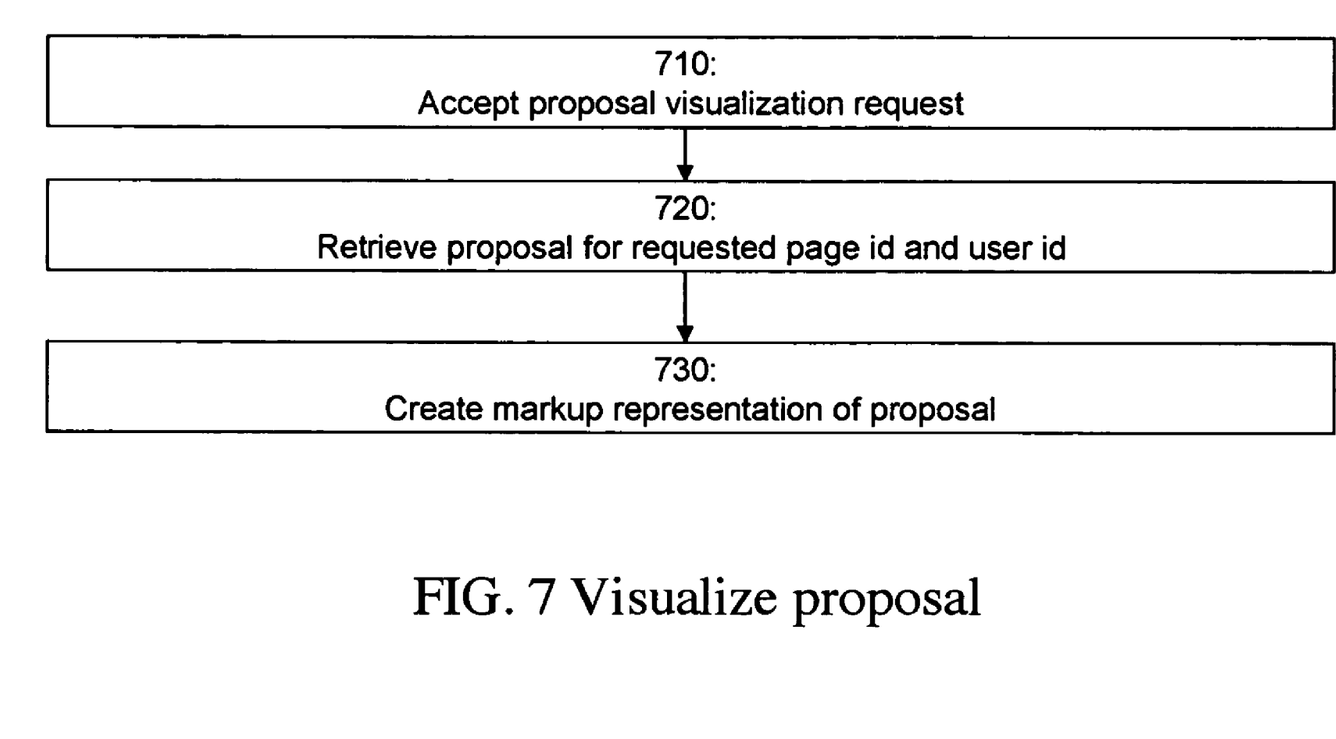
FIG. 7 illustrated the control flow diagram of an embodiment of the method of the present invention, when visualizing the layout proposals generated according to FIG. 5.

After receiving the render request, during aggregation and prior to performing the prior art portlet container invocations, the portal (aggregation) invokes the "VisualizeProposals" operation implemented in software component of the present invention denoted in FIG. 3 as proposal handling 195. The control flow for VisualizeProposals that is executed by proposal handling 195 is illustrated in FIG. 7. In a first step 710, proposal handling implemented in the portal server accepts the visualization request incoming from aggregation 170.

The request contains the ID of the requested page and the user ID. Then, proposal handling 195 retrieves the proposals for this page ID and user ID from the proposal database 190, which is implemented in this specific embodiment as a separate database, step 720. It creates a markup fragment representing the proposals and includes this markup fragment on the portal page, step 730. The markup fragment may include one proposal, or a list of proposals, for each proposal containing a text description as well as one or multiple links that represent a portal action. The link references an URL that contains an action identifier as well as the proposal ID and an acceptance indicator (either TRUE or FALSE.

In an embodiment a proposal for an "add" operation will read like "Do you want to make use of portlet X?" and will contain two links, one link representing an action for accepting the proposal and a further link representing an action for rejecting the proposal. Using his browser, the user may invoke one of said links and thus issue an action request to the portal. The portal then invokes proposal handling to process the request (see FIG. 8).

Figure 8:
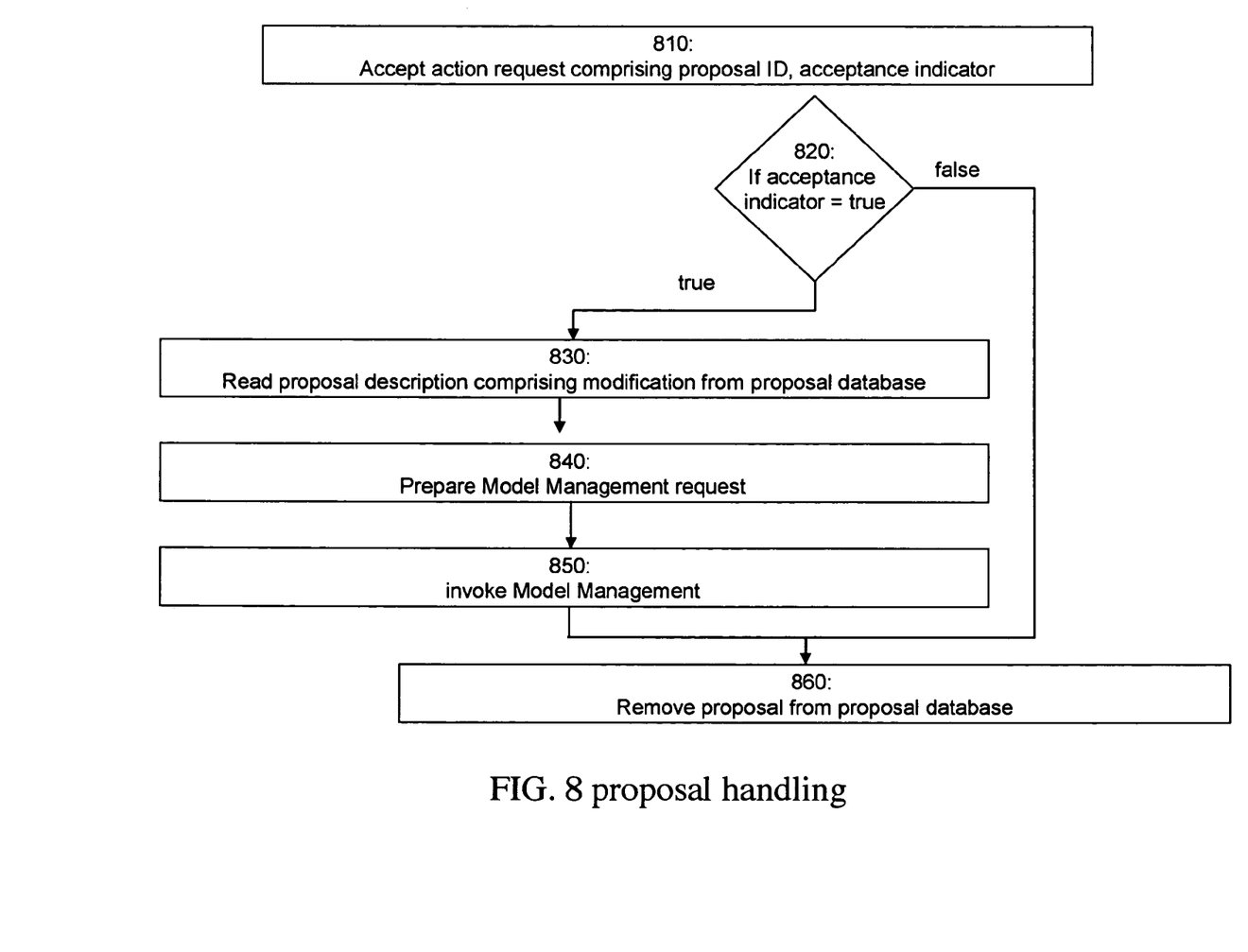
FIG. 8 is an illustration of the control flow showing the handling of the layout proposals implemented in an embodiment of the portal server.

With new reference to FIG. 8, the request contains the proposal ID and an acceptance indicator that are taken from the action request. Proposal handling 195 accepts the action request in step 810 and checks the acceptance indicator flag, step 820. If the acceptance indicator is FALSE—i.e., the user chooses to reject the proposal—the proposal is removed from the database, step 860.

If the acceptance indicator is TRUE—i.e. the user chooses to accept the proposal), proposal handling reads the proposal from the proposal database 190, retrieves the user ID, page ID, operation and portlet ID from the proposal record, step 830, and prepares a model management request according to these data, step 840. It then invokes model management component 161 passing said request. Model management 161 will then perform the requested operation—e.g., it will add portlet X on page Y for this user—by use of prior art techniques. Finally, the proposal is removed from the proposal database 860.

Further embodiments of the method of the present invention include some variations. For example a varied embodiment waits until more than one content model modification has been stored before it generates or visualizes respective layout proposals for the users of the relevant user cluster. This is done in order to concentrate user attention to a few instants of time rather than binding its attention nearly permanently. Here, layout proposals do merge single modifications as long as they are mergeable in absence of contradictions. If they are contradictive, the proposals are sequenced for visualization according to any predetermined criterion, e.g., age of modification, youngest modification having best priority.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for adapting the content structure of a portal, wherein said portal content structure is stored in a content model, wherein a user interface component is provided for controlling the layout of the plurality of pages rendered at said portal, and wherein a model management component comprises the functionality for performing persistent content model modifications, the method comprising:
   storing for a plurality of users participating in said method modification data records comprising history information indicating historic portal content model modifications performed by said plurality of users, wherein a modification data record further comprises a user identification of the modifying user, a page identification, an identification of the underlying modification operation and an identification of the portlet involved in said modification;

performing a grouping of the plurality of users who by grouping users who performed similar or identical portal content model modifications, resulting in a plurality of groups, wherein each group comprises one or more user identifications, and each user identification is associated with a respective participating user;

generating a set of personalized content model modification proposals from one of said modification data records, by selecting a group which comprises the user identification that is comprised of said modification data record and, for each of said users within the selected group: generating a personalized proposal data set based on data of said modification data record and the user identification of a respective user; and in response to receiving a request issued by a client on behalf of a user where the request is directed to the portal:

retrieving at least one of said proposals associated with the requesting user;

generating markup reflecting said at least one proposal; and sending said markup to a client browser associated with said requesting user.

2. The method of claim 1, wherein said grouping comprises performing a clustering algorithm.

3. The method according to claim 1, wherein said proposal is displayed to the user including an option to either accept it or to refuse; and wherein an action request associated with said current user is processed to at least one of:

accept said visualized layout; or refuse said visualized layout.

4. The method according to claim 1, wherein is the retrieving, generating and sending steps are performed in response to an event being selected from the group of:

receiving at the portal a request for a portal page issued by a client on behalf of said user;

receiving at the portal a request corresponding to a login of a user at the portal; and receiving at the portal a request corresponding to actuation of a dedicated user control comprised of the portal markup.

5. The method according to claim 1, wherein the portal model modifications is persistently stored in a modification database.

6. The method according to claim 1, wherein at least one of the following group members is exposed to the user, when said layout proposal is exposed to him:

the name of a portlet associated with the layout proposal;

the description of the portlet associated with the layout proposal;

keywords of a the portlet associated with the layout proposal;

a graphical representation of a portlet associated with the layout proposal and its proposed location at the currently displayed web page; and a markup fragment that is generated by a portlet associated with the layout proposal.

7. The method according to claim 1, wherein the storing includes storing only differences relative to a pre-existing reference content model of said portal.

8. The method according to claim 1, wherein the generating is performed in response to a modification of the content model effectuated by a user, and wherein the modifications of the content model is stored in the portal database.

9. The method according to claim 1, wherein the method is performed asynchronously to a modification of the content model effectuated by a user.

10. An electronic data processing system arranged for adapting the content structure of a portal, wherein said portal content structure is stored in a content model, wherein a user interface component is provided for controlling the layout of the plurality of pages rendered at said portal, and wherein a model management component comprises the functionality for performing persistent content model modifications, the system comprising:

a system for storing for a plurality of users participating in said method modification data records comprising history information indicating historic portal content model modifications performed by said plurality of users, wherein a modification data record further comprises a user identification of the modifying user, a page identification, an identification of the underlying modification operation and an identification of the portlet involved in said modification;

a system for performing a grouping of the plurality of users by grouping users who performed similar or identical portal content model modifications, resulting in a plurality of groups, wherein each group comprises one or more user identifications, and each user identification is associated with a respective participating user; and a system for generating a set of personalized content model modification proposals from one of said modification data records.

11. A non-transitory computer-readable medium comprising a computer program having program code, which when executed, enables a computer system to implement a method for adapting the content structure of a portal, wherein said portal content structure is stored in a content model, wherein a user interface component is provided for controlling the layout of the plurality of pages rendered at said portal, and wherein a model management component comprises the functionality for performing persistent content model modifications, the method comprising:

storing for a plurality of users participating in said method modification data records comprising history information indicating historic portal content model modifications performed by said plurality of users, wherein a modification data record further comprises a user identification of the modifying user, a page identification, an identification of the underlying modification operation and an identification of the portlet involved in said modification;

performing a grouping of the plurality of users by grouping users who performed portal content model modifications, resulting in a plurality of groups, wherein each group comprises one or more user identifications, and each user identification is associated with a respective participating user;

generating a set of personalized content model modification proposals from one of said modification data records, by selecting a group which comprises the user identification that is comprised of said modification data record and, for each of said users within the selected group: generating a personalized proposal data set based on data of said modification data record and the user identification of a respective user; and in response to receiving a request issued by a client on behalf of a user where the request is directed to the portal, retrieving at least one of said proposals associated with the requesting user, generating markup reflecting said at least one proposal, and sending said markup to a client browser associated with said requesting user.

12. A non-transitory computer-readable medium comprising a computer program having program code, which when executed, enables a computer system to implement a method for adapting the content structure of a portal, wherein said portal content structure is stored in a content model, wherein a user interface component is provided for controlling the layout of the plurality of pages rendered at said portal, and wherein a model management component comprises the functionality for performing persistent content model modifications, the method comprising:

storing for a plurality of users participating in said method modification data records comprising history information indicating historic portal content model modifications performed by said plurality of users, wherein a modification data record further comprises a user identification of the modifying user, a page identification, an identification of the underlying modification operation and an identification of the portlet involved in said modification;

performing a grouping of the plurality of users by grouping users who performed similar or identical portal content model modifications, resulting in a plurality of groups, wherein each group comprises one or more user identifications, and each user identification is associated with a respective participating user;

generating a set of personalized content model modification proposals from one of said modification data records, by selecting a group which comprises the user identification that is comprised of said modification data record and, for each of said users within the selected group: generating a personalized proposal data set based on data of said modification data record and the user identification of a respective user;

in response to receiving a request issued by a client on behalf of a user where the request is directed to the portal, retrieving at least one of said proposals associated with the requesting user, generating markup reflecting said at least one proposal, and sending said markup to a client browser associated with said requesting user.

\* \* \* \* \*